US012618471B2

(12) United States Patent (10) Patent No.: US 12,618,471 B2

Doyle et al. (45) Date of Patent: May 5, 2026

(54) RING SEAL COMPATIBLE WITH MULTIPLE PORT TYPES

(71) Applicant: Microflex Technologies Inc., Orange, CA (US)

(72) Inventors: Gregory Doyle, Villa Park, CA (US); Puntaruk Hirunyanont, Westminster, CA (US); James William Martin, Yorba Linda, CA (US)

(73) Assignee: Microflex Technologies Inc., Orange, CA (US)

( * ) Notice: Subject to any disclaimer, the term of this patent is extended or adjusted under 35 U.S.C. 154(b) by 0 days.

(21) Appl. No.: 18/547,126

(22) PCT Filed: Feb. 17, 2022

(86) PCT No.: PCT/US2022/016737

§ 371 (c)(1),
(2) Date: Aug. 18, 2023

(87) PCT Pub. No.: WO2022/182560

PCT Pub. Date: Sep. 1, 2022

(65) Prior Publication Data

US 2024/0141994 A1 May 2, 2024

Related U.S. Application Data

(60) Provisional application No. 63/152,948, filed on Feb. 24, 2021.

(51) Int. Cl.
*F16J 15/10* (2006.01)
*F16J 15/08* (2006.01)
*F16L 17/08* (2006.01)

(52) U.S. Cl.
CPC ......... *F16J 15/104* (2013.01); *F16J 15/0887* (2013.01); *F16L 17/08* (2013.01)

(58) Field of Classification Search
CPC ........ F16J 15/061; F16J 15/08; F16J 15/0881; F16J 15/0887; F16J 15/104; F16L 17/08; F16L 23/20
See application file for complete search history.

(56) References Cited

U.S. PATENT DOCUMENTS 3,137,509 A 6/1964 Kazienko
3,713,660 A * 1/1973 Luthe ................... F16J 15/0887
277/647

(Continued)

FOREIGN PATENT DOCUMENTS

| JP | 2004176835 A | 6/2004 |
| JP | 2013221525 A | 10/2013 |
| WO | 2011024889 A1 | 3/2011 |

OTHER PUBLICATIONS

International Search Report for PCT/US2015/030089 mailed Aug. 10, 2015; 6 pages.

(Continued)

*Primary Examiner* — Nicholas L Foster

(74) *Attorney, Agent, or Firm* — Fitch, Even, Tabin & Flannery LLP

(57) ABSTRACT

An orientation agnostic ring seal includes an annular body defining an axial hole therethrough for fluid passage in an axial direction and having a radial plane that is perpendicular to the axial direction. Both axial sides of the ring seal include a deformable annular protrusion extending from the annular body in an axial direction to a first apex, which is configured to deform upon engagement with a first planar sealing surface, and a first seal ring engagement surface configured to engage a first annular rounded sealing ring. So configured, the ring seal can seal two different types of flow components regardless of its orientation.

23 Claims, 15 Drawing Sheets

(56) References Cited

U.S. PATENT DOCUMENTS

| | | | | |
|---|---|---|---|---|
| 4,477,087 | A | 10/1984 | Sutter, Jr. et al. | |
| RE34,144 | E * | 12/1992 | Leigh | F16J 15/0881 |
| | | | | 277/609 |
| 5,354,072 | A | 10/1994 | Nicholson | |
| 5,720,505 | A * | 2/1998 | Ohmi | F16L 19/0212 |
| | | | | 285/917 |
| 6,286,839 | B1 | 9/2001 | Mitsui et al. | |
| 6,357,759 | B1 | 3/2002 | Azuma et al. | |
| 6,357,760 | B1 | 3/2002 | Doyle | |
| 6,409,180 | B1 * | 6/2002 | Spence | F16J 15/0881 |
| | | | | 277/910 |
| 6,688,608 | B2 | 2/2004 | Doyle | |
| 6,769,697 | B1 * | 8/2004 | Ishikawa | F16J 15/0887 |
| | | | | 277/612 |
| 6,945,539 | B2 * | 9/2005 | Whitlow | F16J 15/0887 |
| | | | | 277/609 |
| 7,140,647 | B2 | 11/2006 | Ohmi et al. | |
| RE39,973 | E * | 1/2008 | Spence | F16J 15/0881 |
| | | | | 277/910 |
| 8,083,267 | B2 * | 12/2011 | Itoi | F16J 15/0887 |
| | | | | 285/368 |
| 8,256,115 | B2 * | 9/2012 | Itoi | F16J 15/0887 |
| | | | | 29/451 |
| 8,662,504 | B2 * | 3/2014 | Kariya | F16J 15/061 |
| | | | | 277/609 |
| 9,739,378 | B2 * | 8/2017 | Vu | F16J 15/0887 |
| 9,845,875 | B2 | 12/2017 | Doyle et al. | |
| 9,869,409 | B2 * | 1/2018 | Vu | F16L 5/10 |
| 9,970,547 | B2 * | 5/2018 | Vu | F16J 15/0806 |
| 10,422,429 | B2 * | 9/2019 | Vu | F16J 15/3236 |
| 10,533,662 | B2 | 1/2020 | Vu | |
| 10,982,768 | B2 * | 4/2021 | Vu | F16J 15/3236 |
| 11,255,433 | B2 * | 2/2022 | Vu | F16J 15/0887 |
| 11,300,205 | B2 * | 4/2022 | Vu | F16J 15/3236 |
| 11,781,651 | B2 * | 10/2023 | Vu | F16J 15/0806 |
| | | | | 277/608 |
| 11,796,089 | B2 * | 10/2023 | Vu | F16L 5/10 |
| 11,802,621 | B2 * | 10/2023 | Sato | F16J 15/0887 |
| 2002/0063396 | A1 * | 5/2002 | Doyle | B25B 27/0028 |
| | | | | 277/609 |
| 2002/0153669 | A1 | 10/2002 | Caplain et al. | |
| 2002/0153673 | A1 | 10/2002 | Caplain et al. | |
| 2003/0164594 | A1 | 9/2003 | Whitlow et al. | |
| 2004/0188955 | A1 * | 9/2004 | Takahiro | F16L 23/20 |
| | | | | 277/626 |
| 2006/0055122 | A1 | 3/2006 | Itoi et al. | |
| 2008/0277879 | A1 | 11/2008 | Pradelle | |
| 2009/0015010 | A1 * | 1/2009 | Itoi | F16L 23/20 |
| | | | | 285/368 |
| 2012/0139235 | A1 | 6/2012 | Koyanagi et al. | |
| 2013/0187343 | A1 | 7/2013 | Tohdoh | |
| 2014/0225367 | A1 * | 8/2014 | Vu | F16J 15/122 |
| | | | | 285/345 |
| 2015/0069721 | A1 | 3/2015 | Okafuji et al. | |
| 2015/0300495 | A1 | 10/2015 | Vu | |
| 2015/0330510 | A1 * | 11/2015 | Doyle | F16J 15/0893 |
| | | | | 277/608 |
| 2020/0240519 | A1 * | 7/2020 | Sato | F16L 23/20 |
| 2025/0043893 | A1 * | 2/2025 | Doyle | F16J 15/106 |

OTHER PUBLICATIONS

Written Opinion of the International Searching Authority for PCT/US2015/030089 mailed Aug. 10, 2015; 7 pages.

* cited by examiner

RING SEAL COMPATIBLE WITH MULTIPLE PORT TYPES

FIELD

This disclosure relates to seals and gaskets for forming a fluid tight seal joint between opposed flow component ports.

BACKGROUND

Ring seals are typically annularly shaped, defining an axially aligned hole for fluid (liquid or gas) passage, two axially opposed end surfaces, a radial inner surface, and a radial outer surface. A simplistic ring seal has planar end surfaces and smooth circular radial inner and outer surfaces that define the inner diameter (ID) and outer diameter (OD) of the ring seal. It is common practice in the industry, however, to utilize seals having different radial cross-sections to obtain varying sealing capabilities for different fluid flow environments. Ring seals are typically formed from a metal such as nickel, stainless steel, and nickel alloys such as C22.

Ring seals are designed for interfacing with a specific port type. The opposed end surfaces of the ring seal are each configured to engage a port of a flow component to form a fluid tight seal between the end surface and the flow component. A commonly used ring seal is a "C seal" that has a radial cross-section of a "C" shape. The end surfaces of C seals engage and compress against a planar surface of a port of a flow component to form a fluid tight seal therebetween. Other C seals include a ridge or extension protruding axially from the end surface to aid in forming a fluid tight seal with the port of the flow component.

Another ring seal type known in the industry is a "W" seal. A typical "W" seal has planar opposed sealing surfaces. The W seal is positioned between two coupling members that have annular projections, respectively, extending therefrom. The planar sealing surfaces engage the annular projections to form a fluid tight seal between the W seal and the coupling members.

A problem with the existing ring seals is that the ring seals are only designed for use with a specific port type. For example, a C seal can only be used with a C-type port of a flow component, and a W seal can only be used with a W-type port. Problems arise when, for example, the port of a flow component on one side of the ring seal is C-type and the port of the flow component on the other side of the ring seal is a W-type. Some have attempted to solve this problem by creating a ring seal having one end surface designed to interface with a C-type port and the opposite end designed to interface with a W-type port. A shortcoming of such a ring seal is that one must be conscious of the orientation of the ring seal when positioning it between the flow components of different port types. Positioning the ring seal in an inverted orientation may cause damage to the flow components or ports thereof. Another shortcoming is that this ring seal cannot be used between flow components with the same port type, thus requiring a user to have a variety of ring seals on hand based on the port types of the flow components being joined together.

Figure 1A:
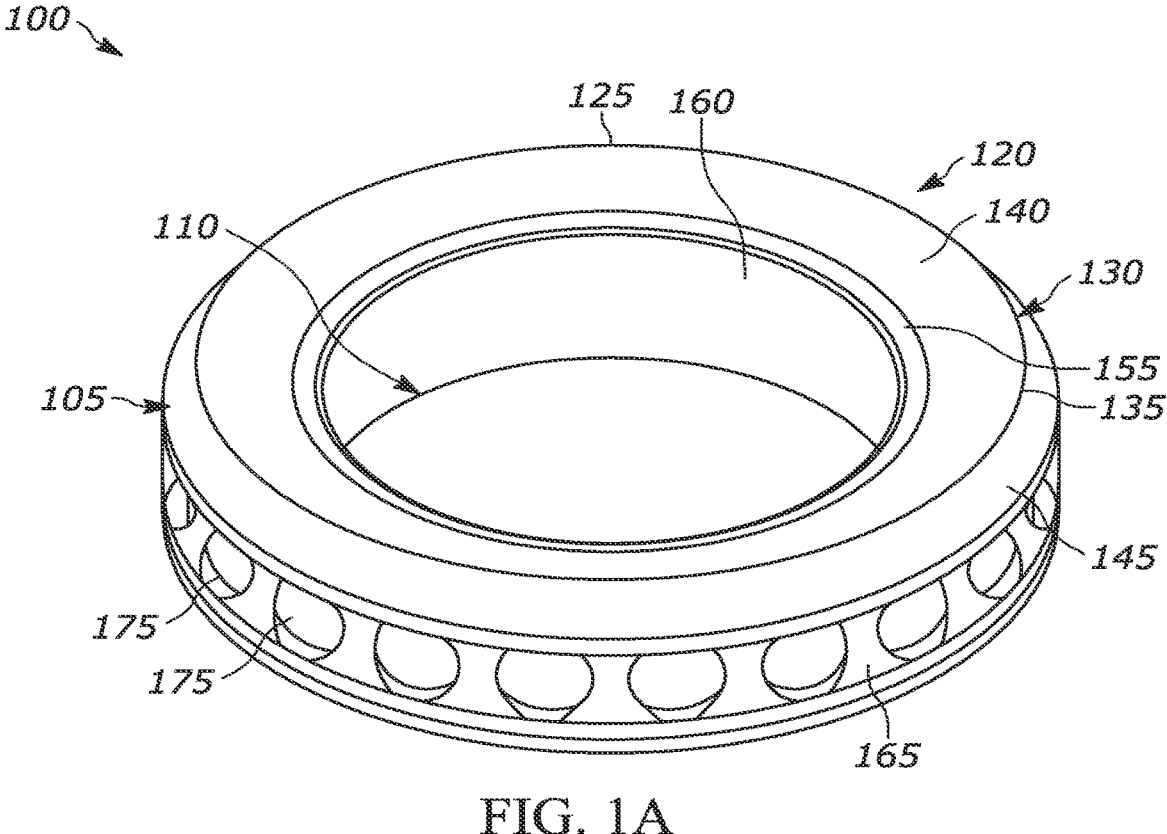
FIG. 1A is a top perspective view of a ring seal according to a first embodiment.
Figure 1B:
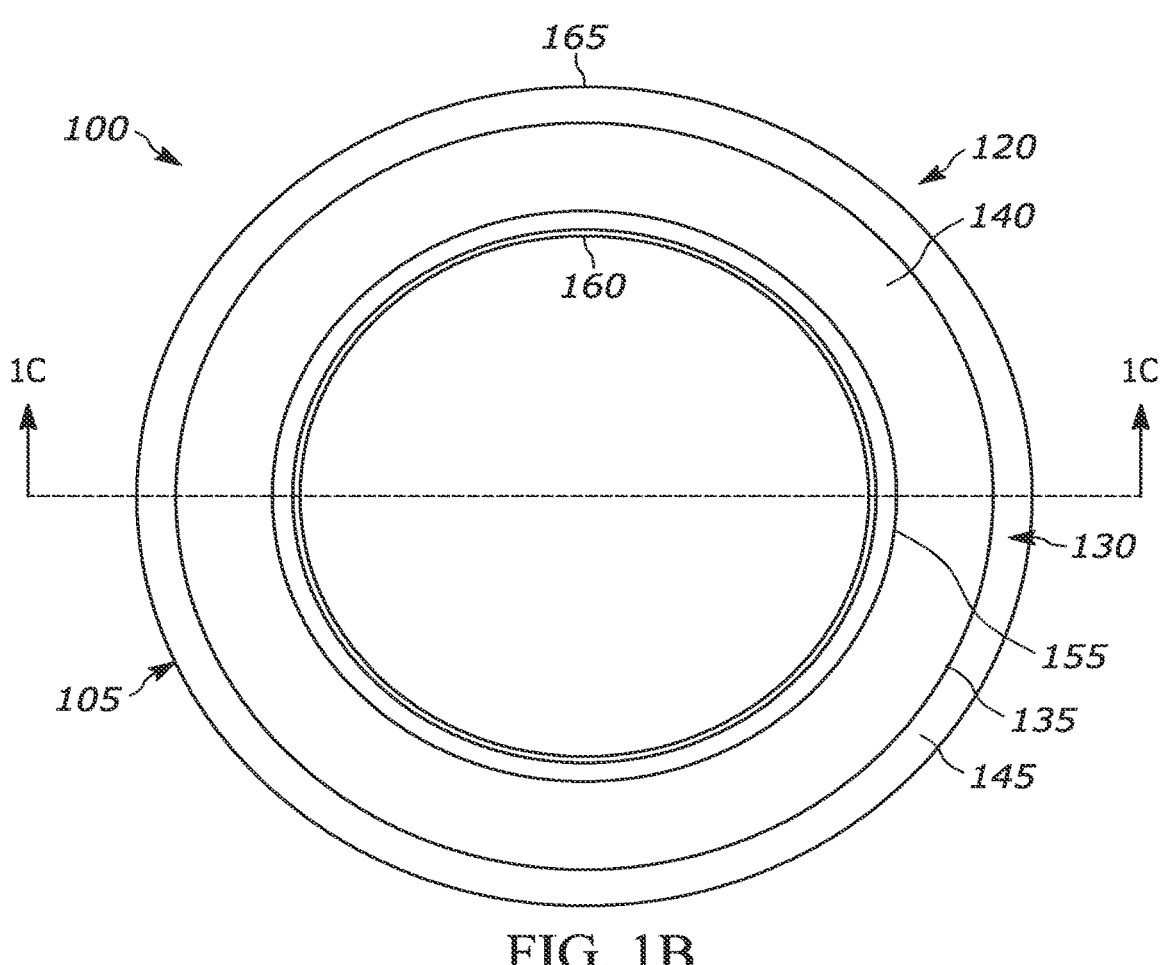
FIG. 1B is a top plan view of the ring seal of FIG. 1A.
Figure 1C:
FIG. 1C is a cross-sectional view of the ring seal of FIG. 1A taken along lines 1C-1C of FIG. 1B.
Figure 1C:
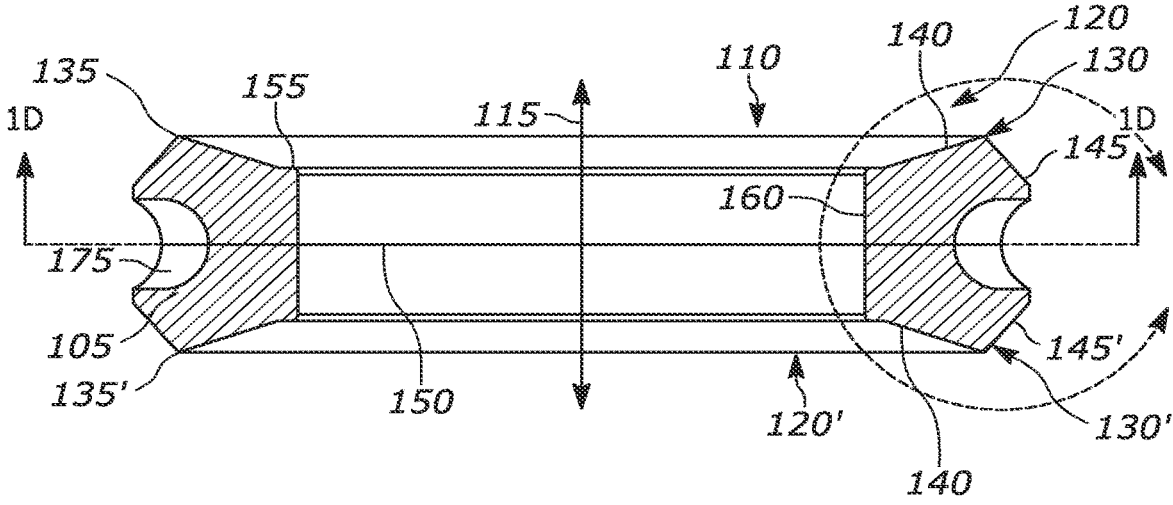
Figure 1D:
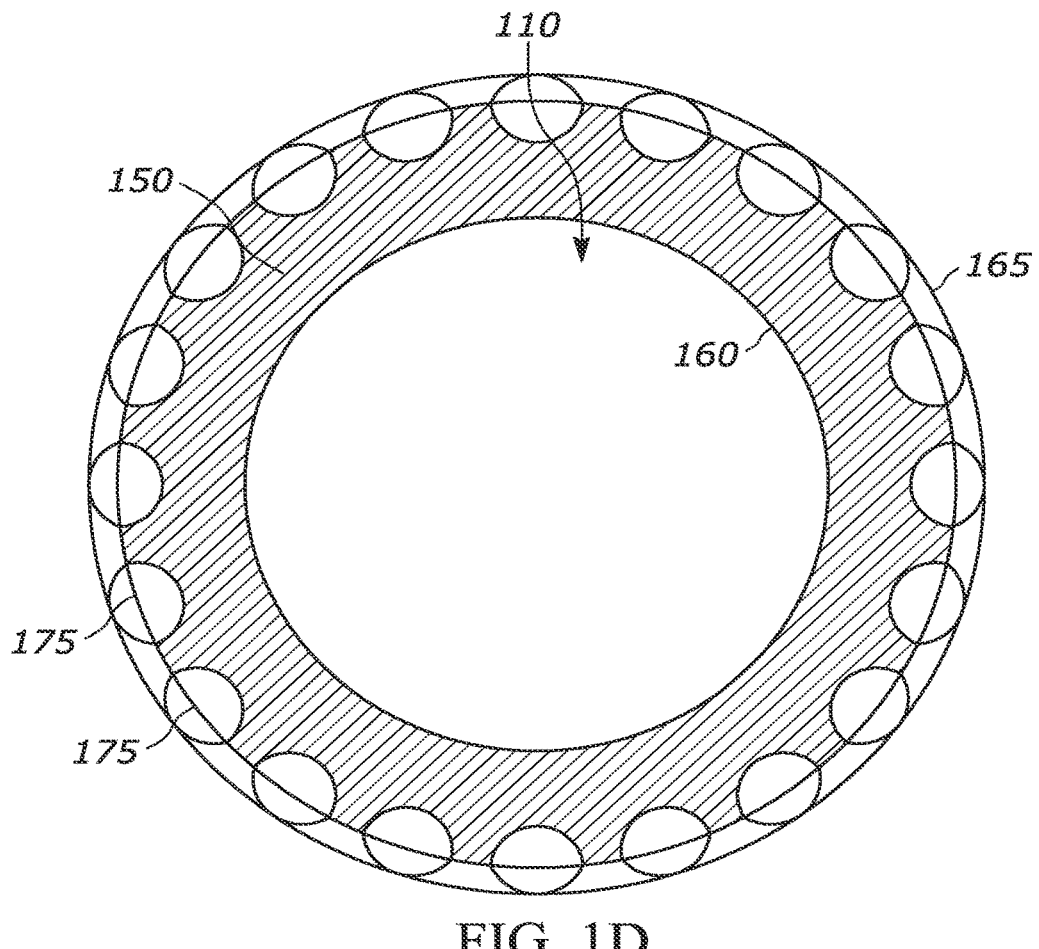
FIG. 1D is a cross-sectional view of the ring seal of FIG. 1A taken along lines 1D-1D of FIG. 1C.
Figure 1E:
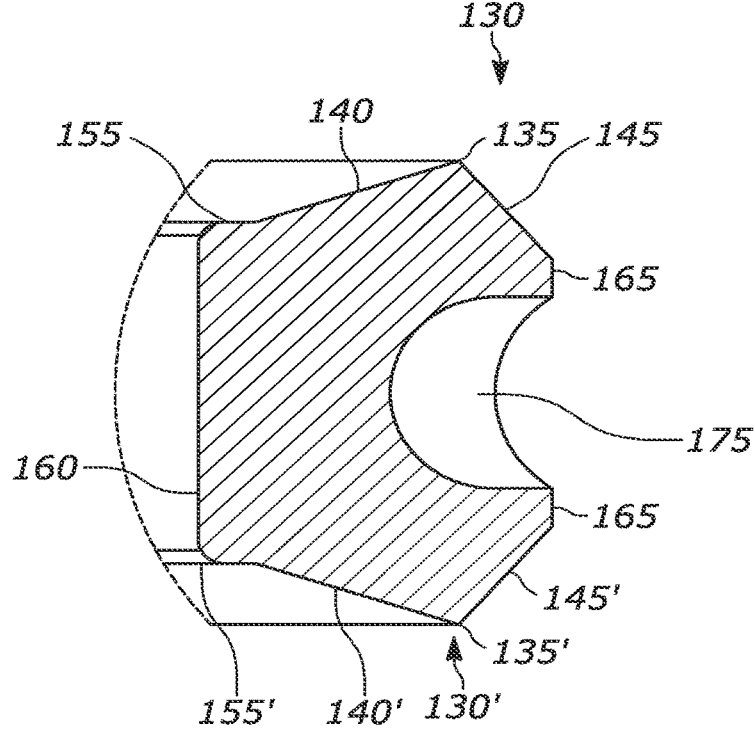
FIG. 1E is a closeup view of an end portion of the ring seal of FIG. 1A as shown in FIG. 1C.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Ring seals are disclosed herein that may be positioned between opposed flow component sealing ports to create a fluid tight seal between the opposed sealing ports. The ring seals create a fluid tight passageway from the first flow component to the second flow component. The ring seals disclosed herein include a sealing surface that may be used in conjunction with at least two different sealing port types (e.g., C-seal type and W-seal type). The embodiments shown and discussed below are symmetrical in that both sealing surfaces of the ring seal may be used in conjunction with multiple sealing port types. For example, the sealing surfaces of the ring seals may be used to seal against either a C-seal type port or a W-seal type port. Thus, a single ring seal may be used to seal the interface between two C-type ports, two W-type ports, or one C-type port and one W-type port. A user may thus use this ring seal irrespective of whether the upper or lower sealing port is C- or W-type since both sides of the ring seal are compatible with either port type.

With reference to FIGS. 1A-E, an example ring seal 100 in accord with these teachings is shown. The ring seal 100 may be used for sealing opposed flow component sealing ports defining a fluid flow path. The ring seal 100 includes an annular seal body 105 that defines an axial hole 110 therethrough for fluid passage in an axial direction illustrated by the arrow 115.

The ring seal 100 includes opposing sealing surfaces 120 and 120' on the axial ends 125 and 125' of the annular seal body 105. The sealing surfaces 120, 120' are brought into engagement with a sealing port of a flow component to create a fluid tight seal between sealing port of the flow component and the sealing surface 120, 120'. Thus, when both sealing surface 120 and sealing surface 120' engage sealing ports of a flow component such that a fluid tight seal is formed, the fluid flows through the axial hole 110 from one flow component and into the other flow component without leaking the fluid between the flow components.

The sealing surface 120 includes an annular extension or annular protrusion 130 extending from the annular seal body 105 in the axial direction to an apex 135. The annular extension 130 is used to engage the substantially planar sealing surface of a C-type port of a flow component to form a fluid tight seal (e.g., a C seal) between the sealing surface 120 and the sealing port of the flow component. The annular extension 130 is deformable such that upon engagement with another surface, such as a sealing surface of a C-type flow component, the annular extension 130 deforms against the surface. The annular extension 130 includes an inner extension surface 140 and an outer extension surface 145 that extend from the apex 135 back toward the annular seal body 105 in opposite directions and at an angle.

The inner extension surface 140 extends from the apex 135 at a non-zero angle relative a radial plane 150 that extends through the axial midpoint of the annular body and is perpendicular to the to the axial direction 115. The inner extension surface 140 extends from the apex 135 inward and toward the second axial end 125' toward a radial surface 155 that is parallel with the radial plane 150. The inner extension surface 140 is a frustoconical surface extending about the circumference of the ring seal 100. The inner extension surface 140 may extend at an angle of about 10-35 degrees relative to the radial plane 150 as an example range. As one specific example, the inner extension surface 140 extends from the apex 135 at an angle of about 18 degrees relative to the radial plane 150. The radial surface 155 extends from the inner extension surface 140 to the inner surface 160 that defines the axial hole 110.

The outer extension surface 145 extends from the apex 135 in the radially outward direction to the outer surface 165 that forms the outer diameter of the ring seal 100. The outer extension surface 145 extends from the apex 135 at a steeper angle relative to the radial plane 150 than the inner extension surface 140. The outer extension surface 145 is a frustoconical surface curving about the circumference of the ring seal 100. The outer extension surface 145 may extend at an angle of about 30-70 degrees relative to the radial plane as an example range. In one specific example, the outer extension surface 145 extends from the apex 135 at an angle of about 51 degrees relative to the radial plane 150.

When the annular extension 130 is forced against a planar sealing surface (e.g., as shown FIGS. 2A-B), the annular extension 130 deforms such that the inner extension surface 140 is brought into engagement with the sealing surface. The inner extension surface 140 deforms into engagement with the sealing surface rather than the outer extension surface 145 because the inner extension surface 140 has a more gradual angle relative to the radial plane 150 than the outer extension surface 145. The deformation of the annular extension 130 when the first sealing surface 120 is forced against a sealing surface causes a greater surface area of the ring seal 100 to engage the sealing surface which aids to form a better seal. Additionally, the deformation of the annular extension 130 to form the seal reduces the impact that any dings or dents in the apex 135 may have on the quality of the seal between the ring seal 100 and the sealing surface. This is advantageous because the apex 135 of the annular extension 130 is prone to receiving minor dings or dents during transport and handling, but the first extension surface 140 is shielded from coming into contact with other objects by the apex 135 thus reducing the amount dings or dents present on the first extension surface 140.

In the embodiment shown, the apex 135 is positioned closer to the outer surface 165 of the ring seal than the inner surface 160. As one example, the apex 135 may be positioned, from the inner surface 160, 50-70% of the distance to the outer surface 165. Moreover, this example ring seal 100 has an outer diameter of 0.282 inches, an inner diameter of 0.180 inches, and the apex 135 has a diameter of 0.256 inches.

The inner extension surface 140 of the sealing surface 120 is positioned to engage the annular rounded surface of a sealing ring of a W-type sealing port. In this first embodiment, the surface that engages the sealing ring, i.e., the inner extension surface 140, is radially inward of the apex 135. The inner extension surface 140 as shown is a frustoconical surface that extends away from the second axial end 120' while extending radially outward to the apex 135. In other forms, additional surfaces of the sealing surface 120 may be configured to engage the sealing ring, for example, the radial surface 155. The inner extension surface 140 forms a surface where the sealing ring of a W-type seal port of a flow component may engage to form a fluid tight seal (e.g., a W seal) with the ring seal 100 as discussed in further detail below. The inner extension surface 140 includes a radial length that is sufficient to receive and engage a sealing ring of a W-type seal port without engaging the apex. At least a portion of the inner extension surface 140 thus has a diameter that is the same as the sealing ring of a W-type seal port, for example, 0.186-0.246 inches. The inner extension surface 140 extends at a small angle relative to the radial plane 150 (e.g., 10-35 degrees) to provide a surface against which the sealing ring of the W-type seal port can be forced against to form the W-seal.

In the embodiment shown, the sealing surface 120' on the second axial end 125' is a mirror image of the sealing surface 120 reflected over the radial plane 150 and functions identically to the sealing surface 120. As shown, in FIG. 1C, the sealing ring 100 is symmetrical about the radial plane 150. Features of sealing surface 120' that correspond to features described in relation to sealing surface 120 are indicated with a prime ('). For example, a feature 145 of the sealing surface 120 that corresponds to a feature of the sealing surface 120' is indicated by 145'. While the ring seal shown in FIGS. 1A-E show the ring seal 100 having two multi-port type compatible sealing surfaces 120, in other embodiments, the ring seal 100 may have only one such sealing surface while the other surface has a different form, for example, is only configured to seal against a single sealing port type.

The ring seal 100 may further include a plurality of bores 175 extending radially inward from the outer surface 165. The plurality of bores 175 may take any number of configurations. For example, preferably the bores 175 are constructed by drilling radially from the ring seal's radial outer surface toward the ring seal's center to minimize costs and reduce any difficulties in manufacturing. Bores 175 constructed in this manner have a circular cross-section. For simplicity, the bores 175 are illustrated as having a circular cross-section though the bores may have cross-sections other shapes without departing from the spirit or scope of the invention. The number of bores 175 and their diameter may vary depending on the desired mechanical properties of the sealing assembly. For example, an increase in the number of bores 175 or increase in the diameter of the bores 175 causes a corresponding decrease in the thickness of the ring seal's internal sidewalls which will alter the mechanical characteristics of the seal, including increasing the seal's ability to deform. However, this increase in the number of bores or increase in the bores' 175 diameter may diminish the elastic recovery (rebound) of the seal 100 after compression and decompression. In a preferred embodiment, the bores 175 are cylindrical and have diameters of between 25% and 75% of the thickness of the ring seal. Diameters less than about 25% will significantly reduce the ring seal's ability to elastically deform. Meanwhile, increasing the diameter of the bores beyond about 75% of the thickness of the ring seal 100 will weaken the structural integrity of the seal 100, resulting in the seal 100 being compressed without substantial deformation of the sealing surfaces 120, 120' which may lead to leaks. In a preferred approach, the bores 175 have a diameter of approximately 50% of the thickness of the ring seal 100. Alternatively, the ring seal 100 could include a groove extending radially inward from the outer surface 165 to provide the deformability aspects discussed above.

Figure 2A:
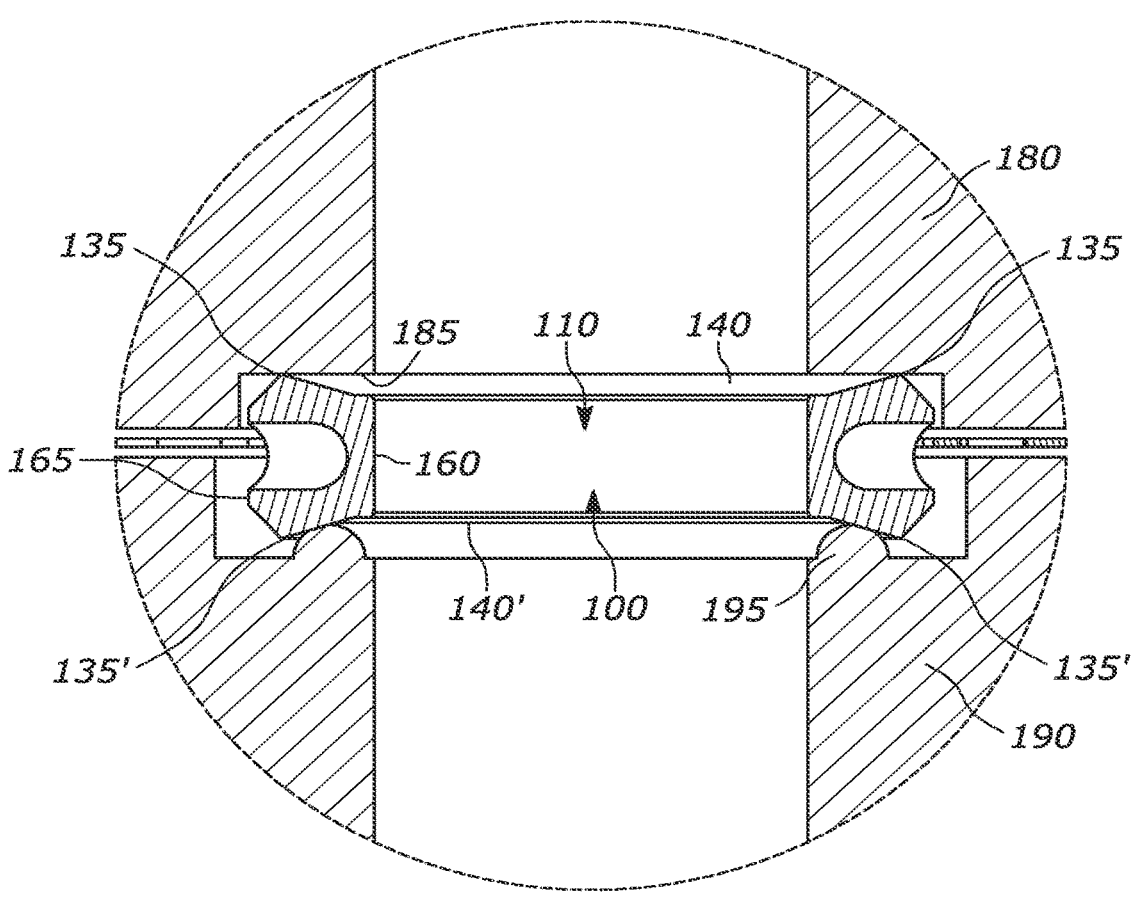
FIG. 2A is a cross-sectional view of the ring seal of FIG. 1A set between a C-type fluid flow component and a W-type fluid flow component prior to compression.
Figure 2B:
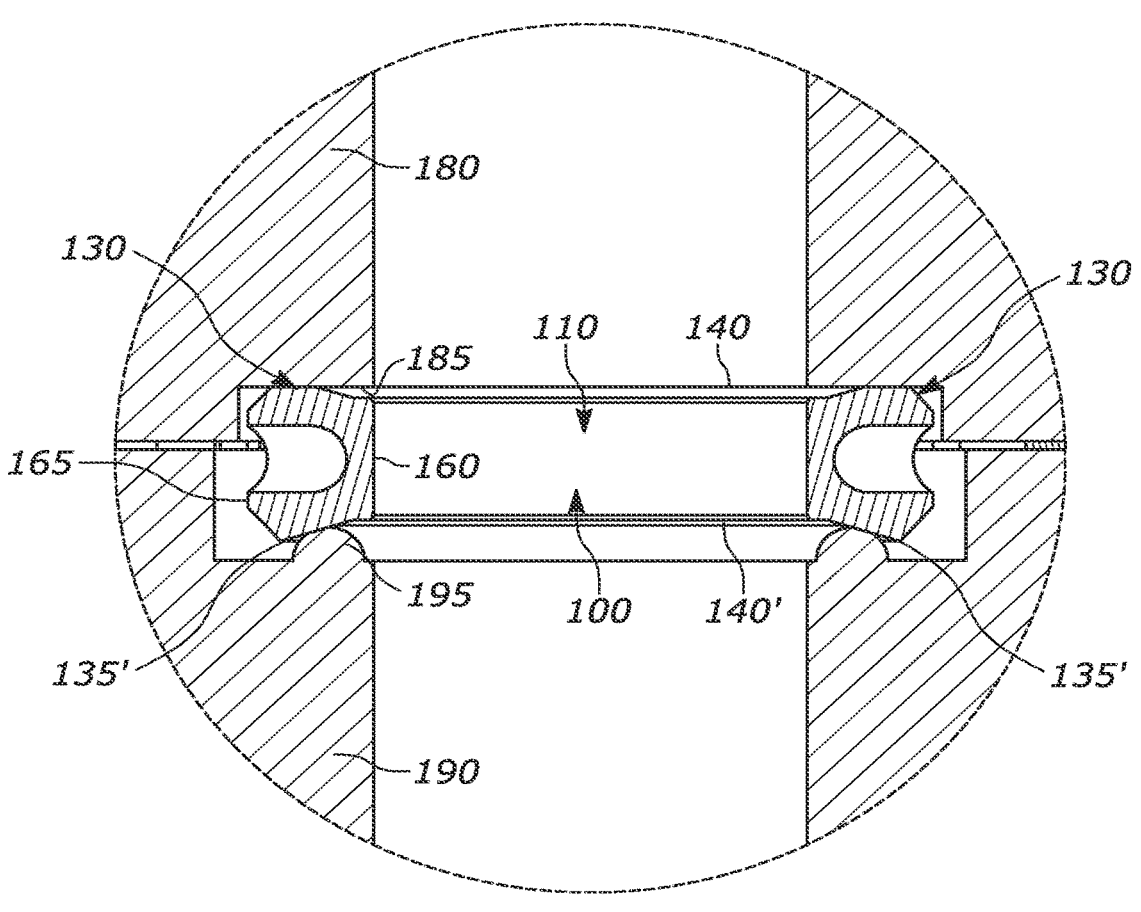
FIG. 2B is a cross-sectional view of the ring seal of FIG. 1A set between the fluid flow components of FIG. 2A after compression.

With reference now to FIGS. 2A-B, the ring seal 100 is shown positioned between a C-type flow component 180 and a W-type flow component 190. The C-type flow component 180 includes a C-type port interface including a planar sealing surface 185. The W-type flow component 190 includes a W-type port interface including a sealing ring 195.

As shown in FIG. 2A, the ring seal 100 is positioned between the flow components 180, 190 with the ring seal 100 in an uncompressed state. Force may then be applied to bring the flow components 180, 190 together to fluidically seal the flow components 180, 190 together. This causes the ring seal 100 to enter a compressed state as shown in FIG.

2B. As shown, the first sealing surface 120 engages the C-type flow component 180, and the second sealing surface 120' engages the W-type flow component 190. As the planar surface 185 of the C-type flow component 180 engages the first sealing surface 120, the annular extension 130 deforms against the planar surface 185, forming a fluid tight seal therebetween. As the sealing ring 195 of the W-type flow component 190 engages the inner extension surface 140' of the second sealing surface 120', the inner extension surface 140' deforms to receive the sealing ring 195 and form a fluid tight seal therebetween. After compression of the ring seal 100, the flow components 180, 190 are fluidically sealed such that fluid may be passed between flow component 180 and 190 via the ring seal 100 without leaking fluid.

Figure 12:
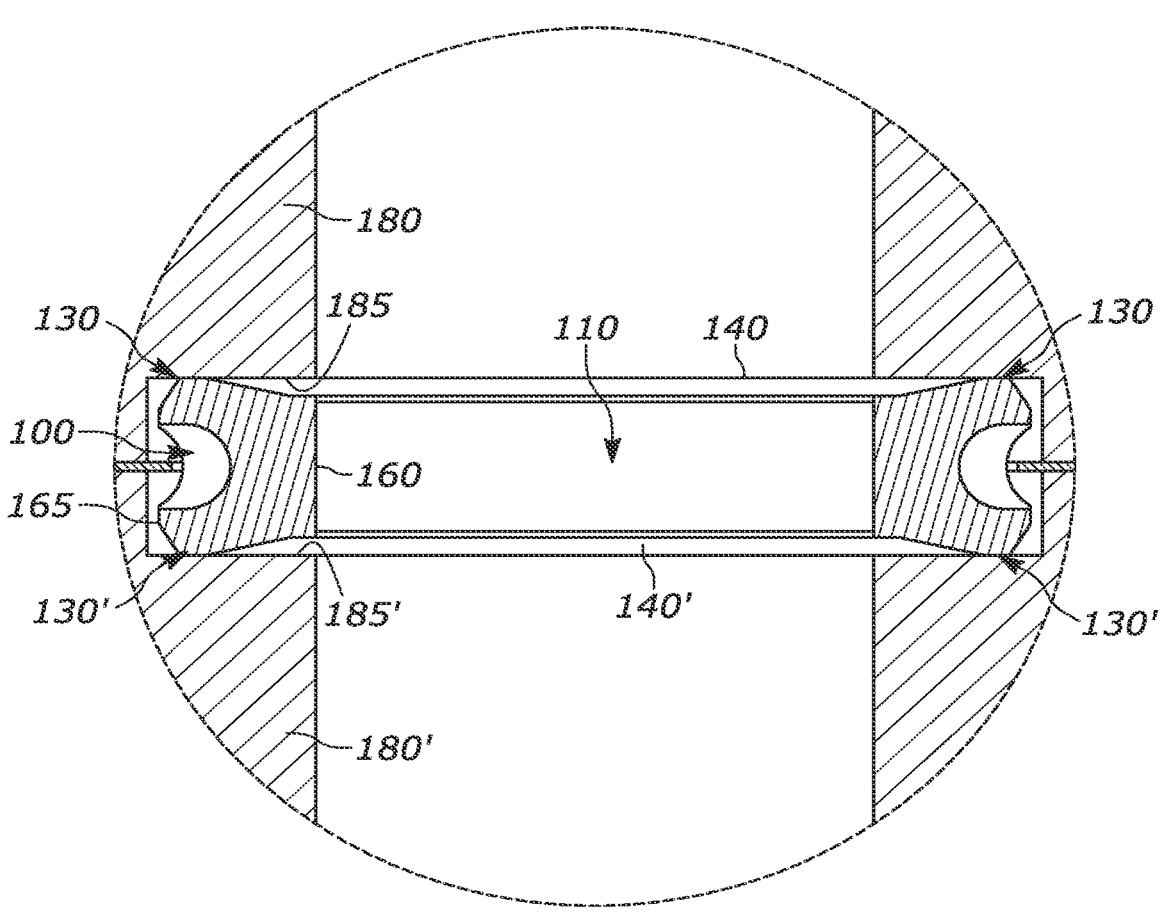
FIG. 12 is a cross-sectional view of the ring seal of FIG. 1A set between the fluid flow components of FIG. 10A after compression.

Thus, the identical sealing surfaces 120, 120' of the ring seal 100 may each be used to form a fluid tight seal with either a C-type flow component or a W-type flow component. Because the sealing surfaces 120, 120' are identical and the ring seal 100 is symmetrical about the radial plane 150, the ring seal 100 can be used to seal C-type, W-type, or a combination of flow components together without regard to the orientation of the ring seal 100. For instance, the ring seal 100 is may be similarly used where the upper flow component is W-type flow component 190 and the lower flow component is a C-type flow component 180, where both the upper flow component and the lower flow component are both C-type flow components 180 as shown in FIG. 12, or where both the upper flow component and the lower flow component are both W-type flow components 190. The seal ring 100 is thus orientation agnostic. Where the ring seal 100 is used to connect two C-type flow components 180 or two W-type flow components 190, the depth of the port design may be adjusted (e.g., increased) to accommodate the thickness of the ring seal 100 so that the ring seal 100 is compressed properly to form a fluid tight seal and not over or under compressed. Similarly, the seal's length in the axial direction could be adapted during manufacture to accommodate depth characteristics for C-type or W-type ports in which the seal may be used.

The remaining FIGS. 3-10 illustrate various alternative forms of the ring seal, each of the various forms being similar in many respects to the ring seal 100 shown and discussed in regard to FIGS. 1A-2B. For conciseness and clarity, the following discussion will primarily highlight the differences of each of the designs as compared to the first example of the ring seal 100 and the other designs discussed herein. For simplicity, the reference numerals used with regard to the first example will be used to indicate features of the ring seal of the subsequent embodiments, with the prefix of the reference numerals changed to correspond to the embodiment being discussed. For instance, features of ring seal 200 of the second design that correspond to features of the ring seal 100 are shown with the prefix of the reference numeral changed from "1" to "2." For example, a feature shown as "105" with regard to the ring seal 100 will be shown as "205" with regard to the ring seal 200. Features of ring seal 300 of the third embodiment that correspond to features of the ring seal 100 are shown with the prefix of the reference numeral changed from "1" to "3" and so on. Also, for simplicity, the following discussion will primarily reference the features of the first sealing surface, however, it should be understood that the description similarly relates to the features of the axially opposed identical second sealing surface.

In all embodiments, the annular extension is deformable and, upon forcible engagement with a planar sealing surface of a C-type flow component, deforms to form a fluid tight seal. Likewise, in all embodiments, one or more surfaces are positioned and sized to receive the seal ring of a W-type flow component to form a fluid tight seal.

Figure 3:
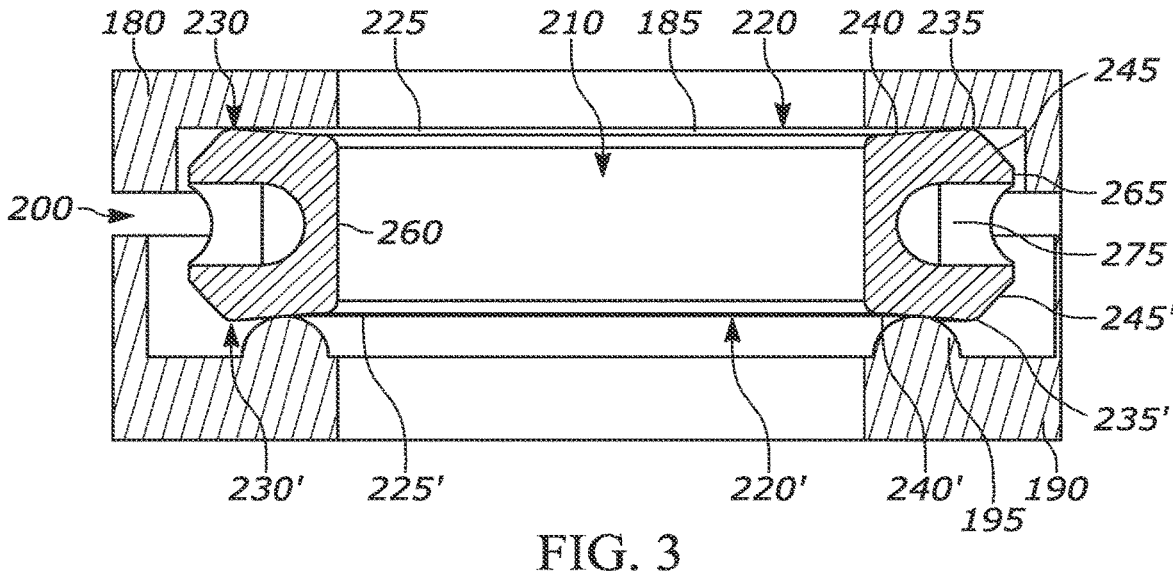
FIG. 3 is a cross-sectional view of a ring seal according to a second embodiment set between the flow components of FIG. 2A prior to compression.

With regard to FIG. 3, a cross-section of a ring seal 200 is shown according to a second embodiment. In the second embodiment, the inner extension surface 240 extends from the apex 235 directly to the inner surface 260 at a constant angle, without transitioning to a radial surface that is parallel with the radial plane 250. The inner extension surface 240 is a frustoconical surface that extends away from the second axial end 225' as the inner extension surface 240 extends radially outward to the apex 235. The apex 235 is positioned similar to the apex 135 of the first embodiment, that is, from the inner surface 260, about 75% of the total distance between the inner surface 260 and the outer surface 265 so that the inner extension surface 240 can adequately engage a W-type flow component. The inner extension surface 240 extends at a smaller angle relative to the radial plane 250 than in the first embodiment. For example, the inner extension surface extends at a 5 degree angle relative to the radial plane 250. The inner extension surface 240 is also the surface designed to engage the seal ring 195 of a W-type flow component 190. The inner extension surface 240 of this second embodiment has a longer radial length than that of the first embodiment, which provides a greater surface area for the seal ring to engage when sealing with a W-type flow component.

Figure 4:
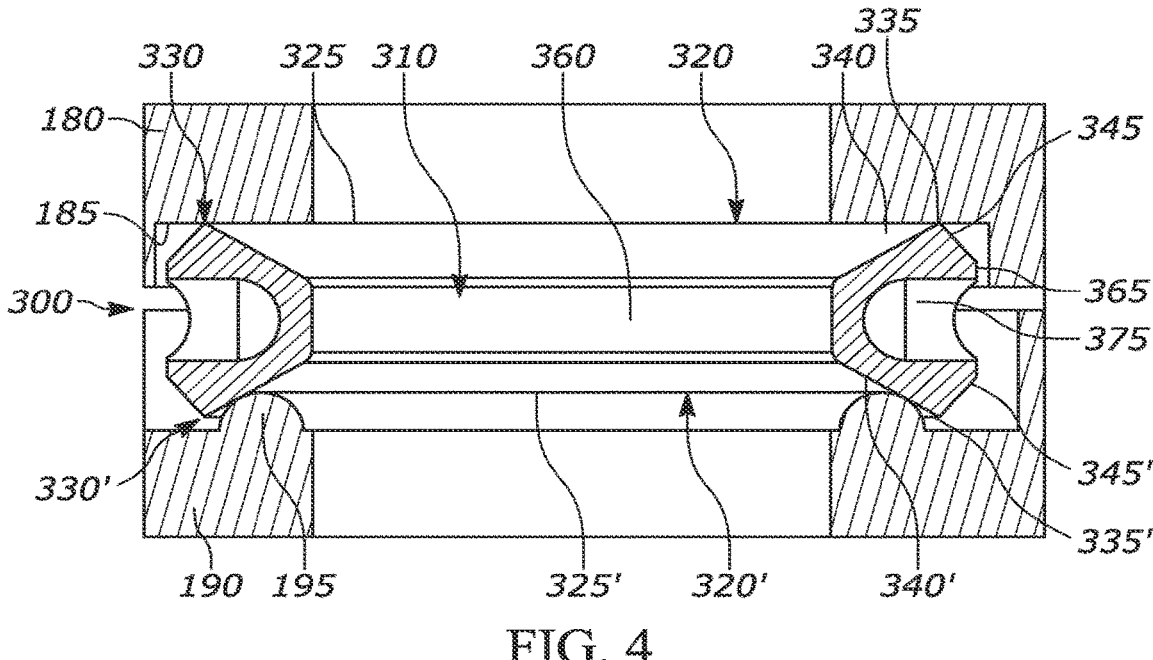
FIG. 4 is a cross-sectional view of a ring seal according to a third embodiment set between the flow components of FIG. 2A prior to compression.

With regard to FIG. 4, a cross-section of a ring seal 300 is shown according to a third embodiment. In the ring seal 300 of the third embodiment, the inner extension surface 340 is similar to that of the second embodiment of FIG. 3 in that the inner extension surface 340 extends radially inward from the apex 335 directly to the inner surface 260 and is designed to engage the seal ring 195 of a W-type flow component 190. The apex 335 is positioned similar to the previous embodiments, about 75% of the total distance between the inner surface 260 and the outer surface 265 from the inner surface 260 so that the inner extension surface 340 can adequately engage a W-type flow component. The ring seal 300 differs from the ring seal 200 of FIG. 3 in that the inner extension surface 340 is sloped at a greater angle relative the radial plane 350 than in the second embodiment. As shown, the inner extension surface 340 angles from the radial plane 350 at a 30 degree angle.

Figure 5:
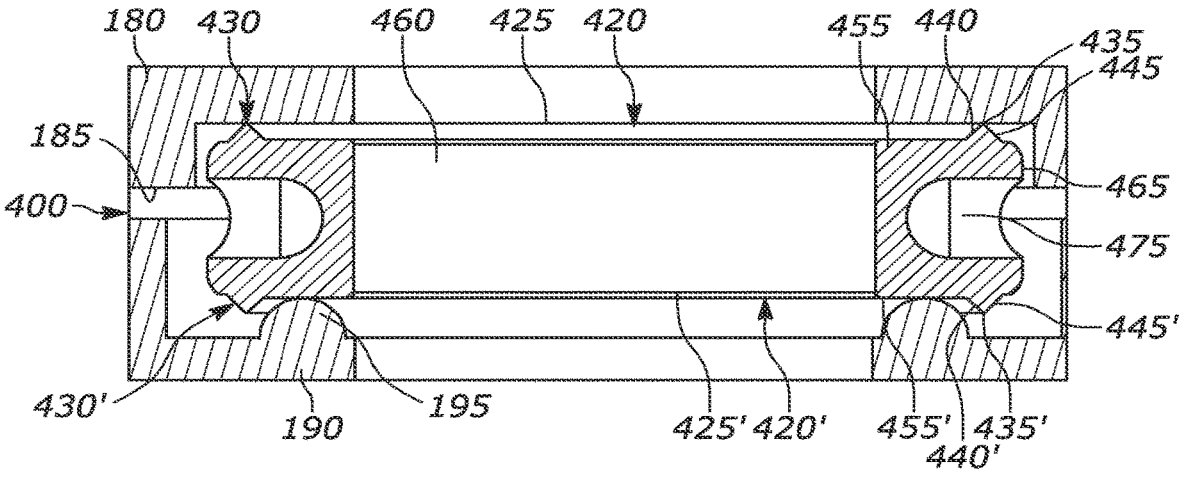
FIG. 5 is a cross-sectional view of a ring seal according to a fourth embodiment set between the flow components of FIG. 2A prior to compression.

With regard to FIG. 5, a cross-section of a ring seal 400 is shown according to a fourth embodiment. The ring seal 400 of the fourth embodiment is similar to the ring seal 100 of the first embodiment in that the ring seal 400 includes a radial surface 455 that extends substantially parallel to the radial plane 450. The radial surface 455 of the ring seal 400, however, is significantly longer than the radial surface 155 of the first embodiment. As shown in FIG. 5, in this fourth embodiment, the radial surface 455 is designed to engage the seal ring 195 of a W-type flow component 190. The radial surface 455 thus extends a length in the radial direction such that it is positioned and sized to receive and engage the annular seal ring 195 of the W-type flow component 190. As shown with regard to the second sealing surface 420', the fluid tight seal is thus formed between the radial surface 455' and the annular seal ring 195 when used with a W-type flow component in this embodiment.

With regard to the annular extension 430, the inner extension surface 440 and the outer extension surface 445 extend from the apex 435 in opposite radial directions, but at approximately the same angle with respect to the radial plane 450 (i.e., 45 degrees). The apex 435 of the annular extension 435 is positioned, from the inner surface 460, about 75% of the total distance from the inner surface 460 to the outer surface 465 so that the radial surface 455 can adequately engage a W-type flow component.

Figure 6A:
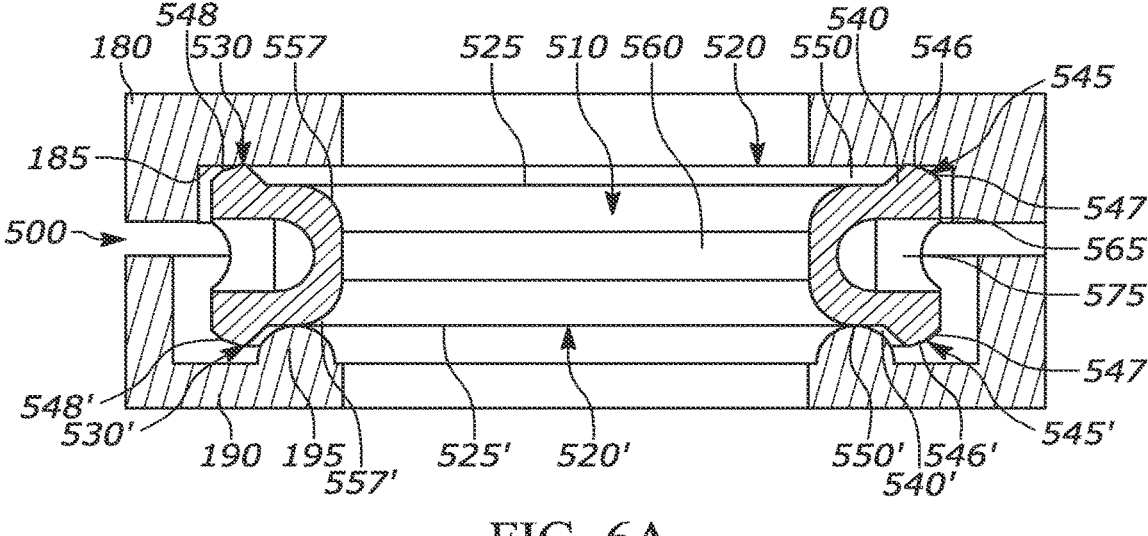
FIG. 6A is a cross-sectional view of a ring seal according to a fifth embodiment set between the flow components of FIG. 2A prior to compression.
Figures 6B, 7:
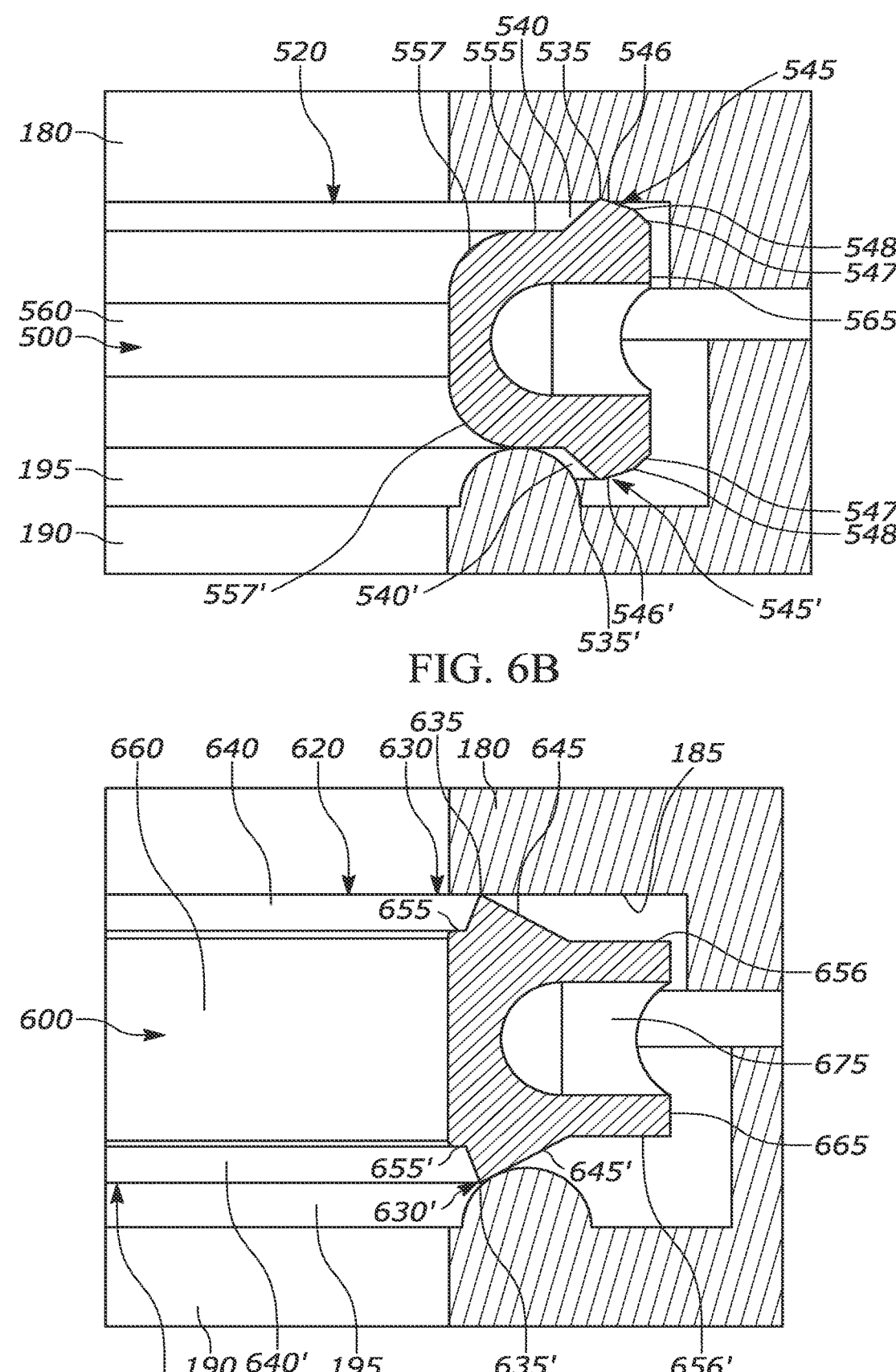
FIG. 6B is a closeup view of an end portion of the ring seal of FIG. 6A.
FIG. 7 is a cross-sectional view of an end portion of a ring seal according to a sixth embodiment set between the flow components of FIG. 2A prior to compression.

With regard to FIGS. 6A-6B, a cross-section of a ring seal 500 is shown according to a fifth embodiment. Similar to the ring seal 400 of the fourth embodiment, the radial surface 555 has a greater radial length than in the first embodiment, such that the radial surface 555 is positioned and sized to receive and engage the annular seal ring 195 of the W-type flow component 190 to form a W-type seal (e.g., see the second seal surface 520' in FIG. 6). The ring seal 500 of this fifth embodiment differs from the ring seal of the fourth embodiment in that the radial surface 555 is connected to the inner surface 560 by a curved portion 557 having a significantly larger radius of curvature than in the fourth embodiment.

Another significant difference between the ring seal 500 of the fifth embodiment and the ring seals of the previous embodiments is that in this embodiment, the annular extension 530 deforms such that a greater portion of the outer extension surface 545 is brought into engagement with a planar surface 485 of the C-type flow component to form the fluid tight seal than the inner extension surface 540. In the previous embodiments, a greater portion of the inner extension surface engages the sealing surface of the C-type flow component 180 to form the fluid tight than the outer extension surface. Also, the apex 535 aids to prevent the outer extension surface 545 from coming into contact with other objects that may mar the outer extension surface 545 because the apex 535 extends further in the axial direction that the outer extension surface 545.

Another difference between this embodiment and the previous embodiments is that the outer extension surface 545 is formed of two surfaces 546, 547. The first surface 546 has a first general angle relative to the axial direction 515 and extends to from the apex 535 to a ridge 548. The second surface 547 has a second general angle relative to the axial direction 515 extending from the ridge 548 back toward the sealing surface 520 at a steeper general angle, i.e., sloping toward the first sealing surface 520 more than the first surface 546. The second surface 547 of the outer extension surface 545 extends to the outer surface 565. The first general angle of the first surface 546 will typically be, relative to the axial direction 515, in the range of about 91 to about 125 degrees, and more about preferably 95 to about 110 degrees, and most preferably about 99 degrees, and the second general angle of the second surface 547 will typically be in the range of about 110 to about 175 degrees, and more preferably about 125 to about 145 degrees, and most preferably about 135 degrees. As shown, the inner extension surface 540 extends at a steeper angle than the first surface 546 of the outer extension surface 545 thus allowing the outer extension surface 545 to be forced against a planar surface to form the fluid tight seal upon deformation of the annular extension 530. The inner extension surface 540 may extend from the apex 535 at an angle of 45 degrees relative to the axial direction 515. A more detailed explanation of the annular extension 530 and the advantages associated with this particular annular configuration arrangement can be found in U.S. Pat. No. 9,845,875, which is incorporated herein by reference.

The apex 535 of the annular extension 535 is positioned, from the inner surface 560, about 75% of the total distance from the inner surface 560 to the outer surface 565 so that the radial surface 555 can adequately engage a W-type flow component.

With regard to FIG. 7, a cross-section of a ring seal 600 according to a sixth embodiment is shown. This ring seal 600 differs from the previous ring seal embodiments in that the apex 635 of the annular extension 630 is closer to the inner surface 660 than the outer surface 665. In this embodiment, the apex 635 of the annular extension 635 is, from the inner surface 660, about 14% of the total distance from the inner surface 660 to the outer surface 665 so that the outer extension surface 645 can adequately engage a W-type flow component.

In this embodiment, the inner extension surface 640 of the annular extension 630 slopes back from the apex 635 at a much steeper slope than the outer extension surface 645. In the embodiment, shown, the inner extension surface 640 extends at a slope of 70 degrees relative to the radial plane 650 and the outer extension surface extends at an angle of 30 degrees relative to the radial plane 650. Similar to the ring seal 500 of the fifth embodiment, the outer extension surface 645 of the annular extension 630 engages the planar surface 185 of the C-type flow component 180 to form the fluid tight seal therebetween. In this embodiment, the outer extension surface 645 of the ring seal 600 does not extend to the outer surface 665, but instead extends to second radial surface 656 that extends substantially parallel to the radial plane 650 to the end surface 650.

Another difference in this embodiment is that the outer extension surface 645 is the surface designed to engage a W-type flow component 190 seal ring 195. As shown in FIG. 7 with regard to the second sealing surface 620', the outer extension surface 645' engages the annular sealing ring 195 of the W-type flow component 190 to form the fluid tight seal therebetween.

Figure 8:
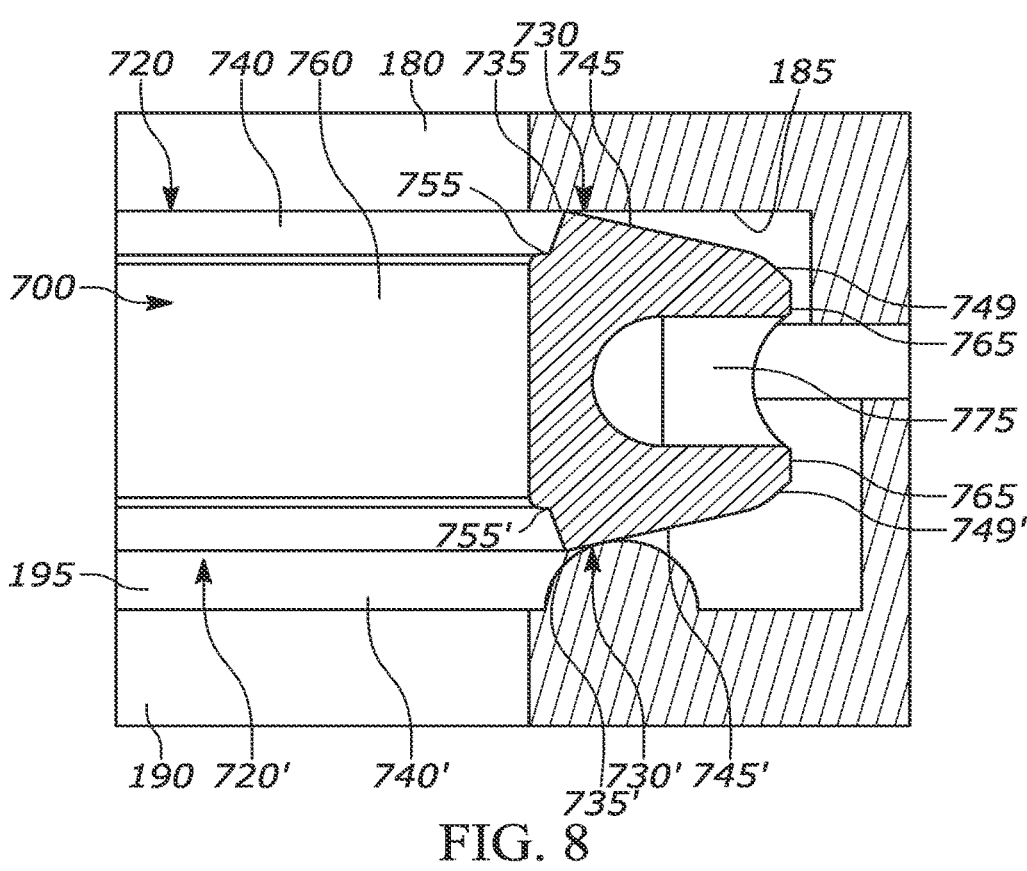
FIG. 8 is a cross-sectional view of an end portion of a ring seal according to an seventh embodiment set between the flow components of FIG. 2A prior to compression.

With regard to FIG. 8, a cross-section of a ring seal 700 is shown according to a seventh embodiment. The ring seal 700 is similar to the ring seal 600 of the sixth embodiment in that the outer extension surface 745 is designed to engage the seal ring 195 of a W-type flow component 190. As shown in FIG. 8 with regard to the second sealing surface 720', the annular seal ring 195 of the W-type flow component 190 engages the outer extension surface 745' to form the fluid tight seal. The apex 735 of the annular extension 735 is, from the inner surface 760, about 14% of the total distance from the inner surface 760 to the outer surface 765 so that the outer extension surface 745 can adequately engage a W-type flow component.

One difference in between this ring seal 700 of the seventh embodiment compared to the ring seal 600 of the sixth embodiment is with regard to the slope of the inner extension surface 740 and outer extension surface 745. In this seventh embodiment, the inner extension surface 740 extends at a slope of 70 degrees relative to the radial plane 750 and the outer extension surface 745 extends at an angle of 14 degrees. Thus, the slope of the outer extension surface 745 is more gradual relative to the radial plane 750 than in the sixth embodiment. As shown, the outer extension surface 745 extends from the apex 735 toward the outer surface 765 with the outer extension surface 745 transitioning to the outer surface 765 via a curved portion 749. Since the outer extension surface 745 has a more gradual slope relative to the radial plane 750 than the inner extension surface, the outer extension surface 745 is the surface of the annular extension 730 that deforms against the planar surface 185 of a C-type flow component 180 to form the fluid tight seal.

Figure 9:
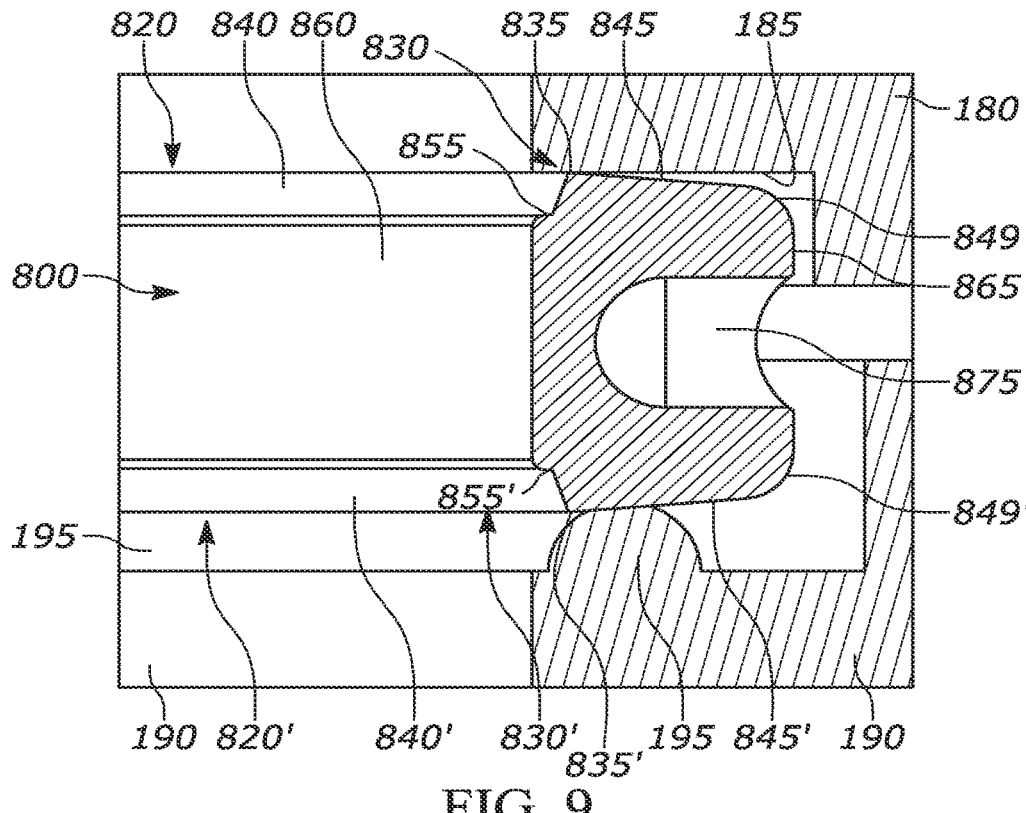
FIG. 9 is a cross-sectional view of an end portion of a ring seal according to an eighth embodiment set between the flow components of FIG. 2A prior to compression.

With regard to FIG. 9, a cross-section of a ring seal 800 is shown according to an eighth embodiment. The ring seal 800 is similar to the ring seal 700 of the seventh embodiment, one primary difference being the slope of the outer extension surface 845 relative the radial plane 850. In the eighth embodiment shown, the outer extension surface extends at a 5 degree angle relative to the radial plane 850. The outer extension surface 845 thus has a more gradual slope than in the ring seal 700 of the seventh embodiment. Also, the curved portion 849 connecting the outer extension surface 845 to the outer surface 865 has a larger radius of curvature than the curved portion 749 of the seventh embodiment.

Figure 10A:
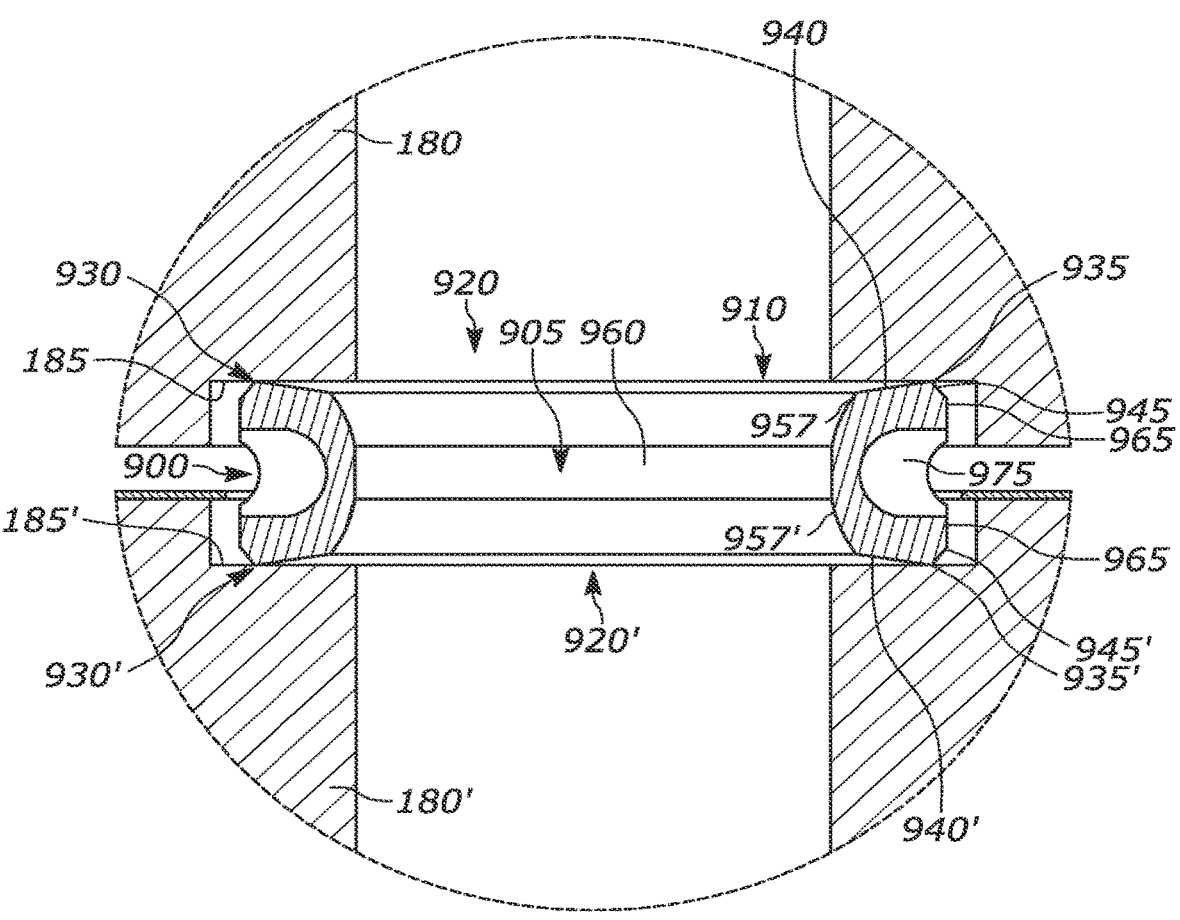
FIG. 10A is a cross-sectional view of a ring seal according to a ninth embodiment set between two C-type fluid flow components prior to compression.
Figure 10B:
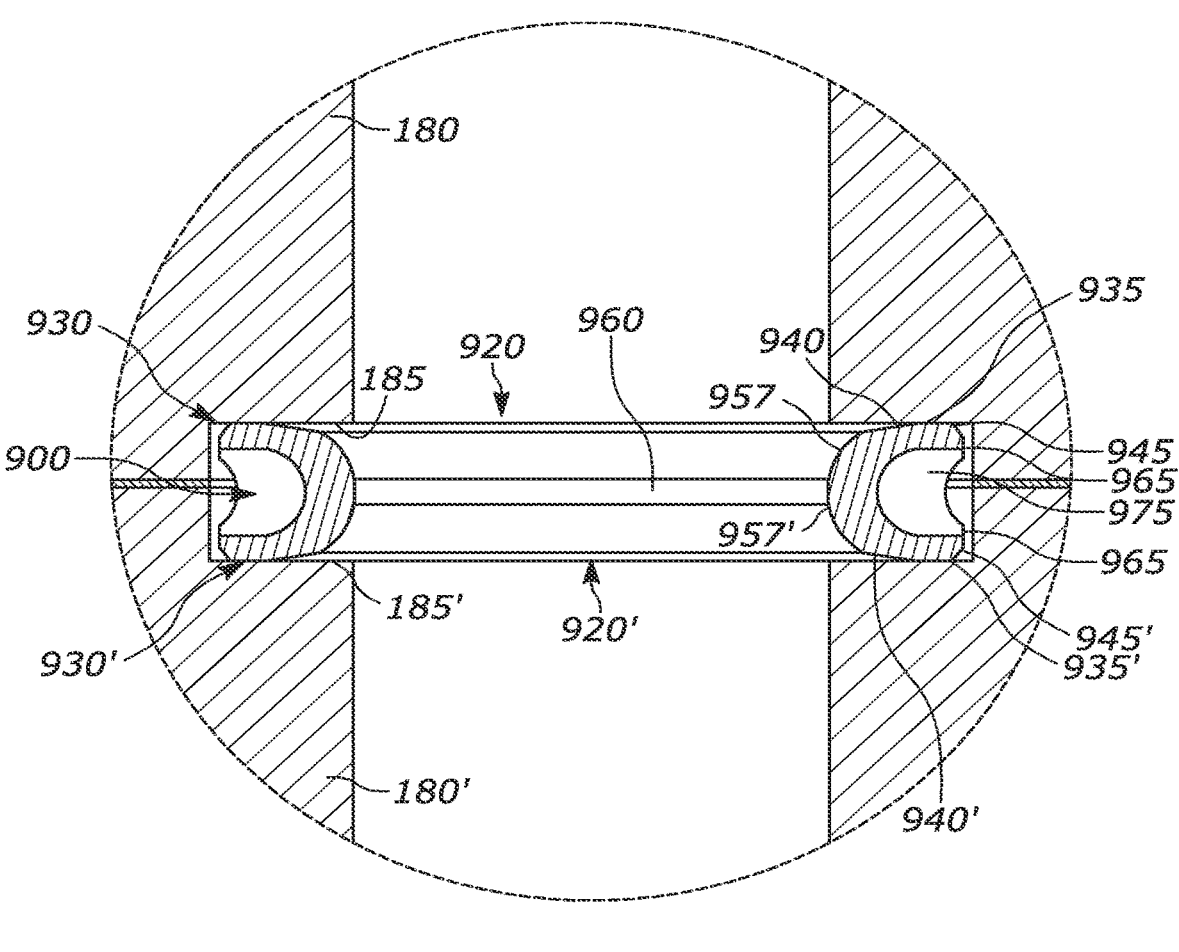
FIG. 10B is a cross-sectional view of the ring seal of FIG. 10A set between the fluid flow components of FIG. 10A after compression.

With regard to FIGS. 10A-B, a cross-section of a ring seal 900 is shown according to a ninth embodiment. The ring seal 900 is similar in many respects to the ring seal of the first embodiment. One difference between the ring seal 900 and the ring seal 100 of the first embodiment is that the apex 935 is positioned closer to the outside diameter of the ring seal 900. As shown, the apex 935 is positioned, from the inner surface 960, about 86% of the total distance from the inner surface 960 to the outer surface 965. In this embodiment, the ring seal does not include a radial surface, but instead the ring seal includes a curved portion 957 that curves outward from the inner surface 960 to the inner extension surface 940. The inner extension surface 940 extends at a 57 degree angle relative to the radial plan 950 to the apex 935 and the outer extension surface 945 extends at a 50 degree angle from the apex 935 relative to the radial plane 950. The bores 975 of the ring seal 900 also extend deeper into the ring seal 900 than in the previous embodiments. This enables the ring seal 900 to be compressed with less force when deforming against two opposed sealing surfaces to form a fluid tight seal therebetween.

As mentioned above, each of the ring seals of the various embodiments include sealing surfaces designed to engage both a C-type flow component 180 and a W-type flow component 190. The example embodiments above show how the ring seal embodiments are used to form a seal between a C-type flow component 180 and a W-type flow component 190. As shown in FIGS. 10A-B, the ring seal 900 is positioned between two C-type flow components 180, 180'. In FIG. 10A, the ring seal 900 is positioned between the sealing surfaces 185, 185' of the C-type flow components 180, 180' in an uncompressed state. In FIG. 10B, the ring seal 900 is shown positioned between the C-type flow components 180, 180' in a compressed state, deformed against the sealing surface 185, 185' of the flow components 180, 190 to form a fluid tight seal therebetween. Those having skill in the art will readily appreciate that any of the other ring seal embodiments described herein could similarly be positioned between two C-type flow components 180, 180' to form a fluid tight seal between the two C-type flow components 180, 180' using the sealing surfaces of the ring seal configured to engage a C-type flow component 180. As another example, FIG. 12 shows the ring seal 100 of the first embodiment positioned between two C-type flow components 180, 180'.

Figure 11A:
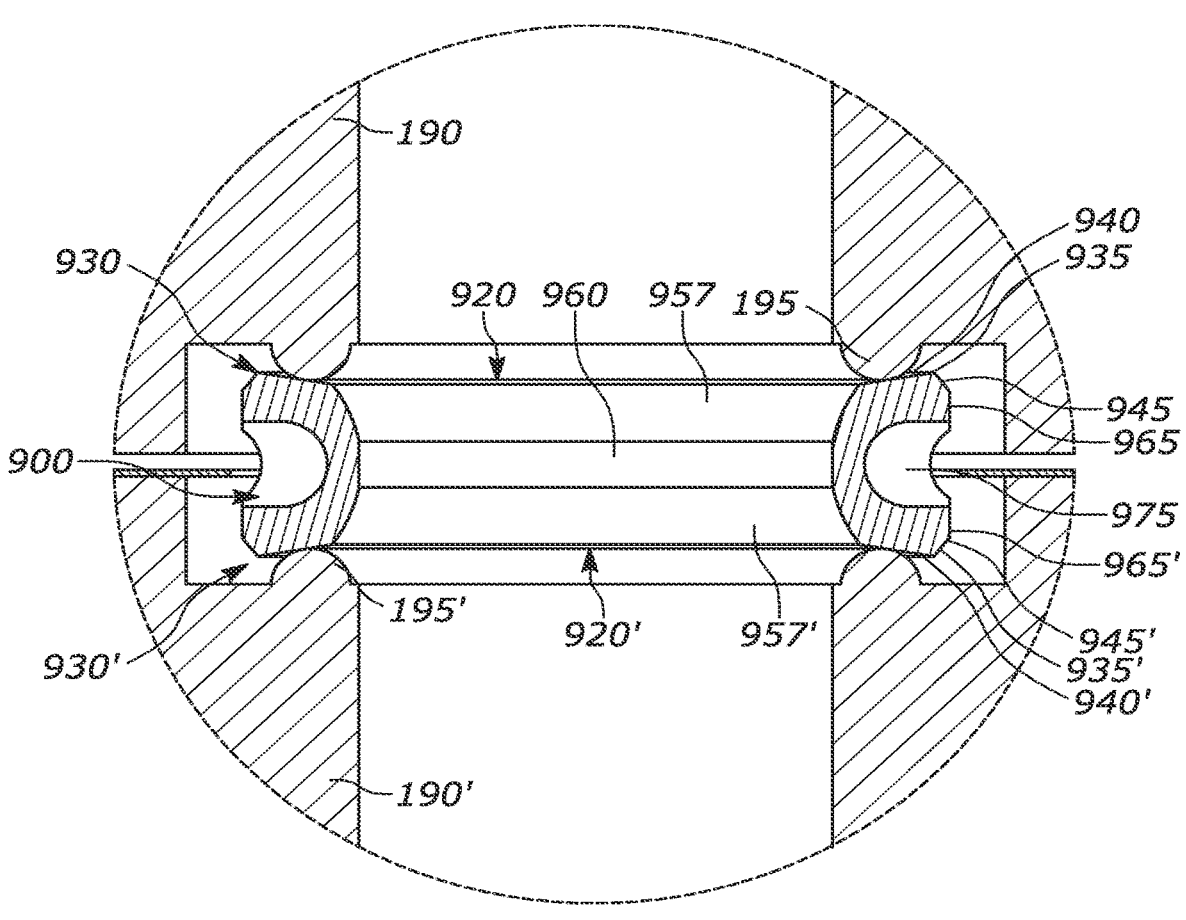
FIG. 11A is a cross-sectional view of the ring seal of FIG. 10A set between two W-type fluid flow components prior to compression.
Figure 11B:
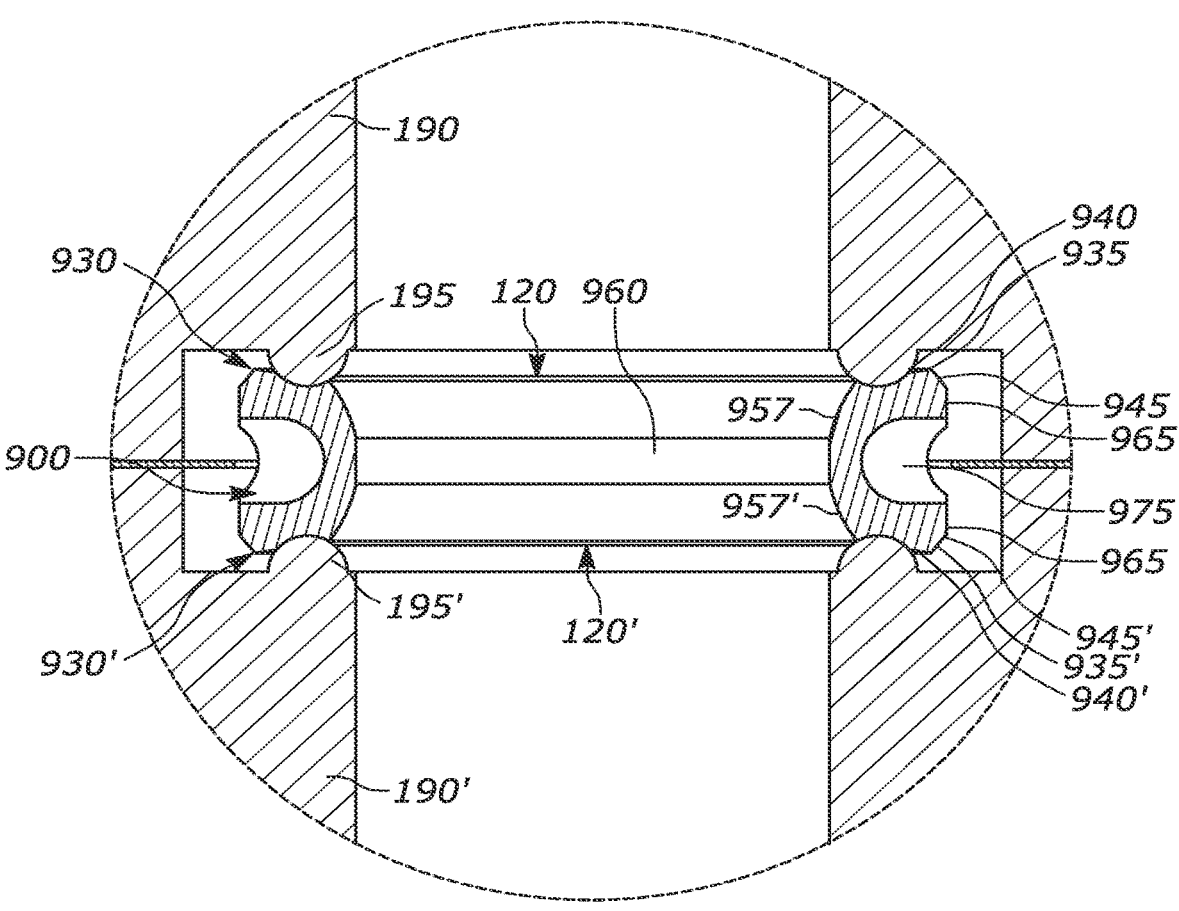
FIG. 11B is a cross-sectional view of the ring seal of FIG. 10A set between the fluid flow components of FIG. 11A after compression.

With reference to FIGS. 11A-B, the ring seal 900 is positioned between two W-type flow components 190, 190'. In FIG. 11A, the ring seal 900 is positioned between the sealing rings 195, 195' of the flow components 190, 190' in an uncompressed state. In FIG. 10B, the ring seal 900 is shown positioned between the flow components 190, 190' in a compressed state, deformed against the sealing ring 195, 195' of the flow components 190, 190' to form a fluid tight seal therebetween. Those having skill in the art will readily appreciate that any of the other ring seal embodiments described herein could similarly be positioned between two W-type flow components 190, 190' to form a fluid tight seal between the two W-type flow components 190, 190' using the sealing surfaces of the ring sing configured to engage a W-type flow component 190.

While in each of the above embodiments the ring seal is shown and described as symmetrical about the radial plane, such that the first sealing surface includes the same seal configuration as the second sealing surface, the disclosure is not so limited. It should be appreciated that a ring seal could be formed where the first sealing surface includes a seal surface according to one of the above-described embodiments, while the second sealing surface includes a sealing surface of another of the described embodiments. As an example, a ring seal may include the first sealing surface 120 of the first embodiment along with the second sealing surface 220' of the second embodiment. Thus, while the ring seal may not be symmetrical, the ring seal remains orientation agnostic, with both sealing surfaces of the ring seal configured to engage the sealing surface of flow components of different types (e.g., C-type and W-type).

It should further be appreciated that in some forms, only one sealing surface is compatible with multiple seal types (e.g., C-type or W-type) while the other sealing surface is only configured to form a seal of a single type (e.g., a prior art sealing surface).

While this invention has been described with respect to various specific examples, it is to be understood that various modifications may be made without departing from the scope thereof. Therefore, the above description should not be construed as limiting the invention but merely as an exemplification of preferred embodiments thereof and that the invention can be variously practiced within the scope of the following claims.

What is claimed is:

1. A ring seal comprising:
   an annular body defining an axial hole therethrough for fluid passage in an axial direction, the annular body having a radial plane perpendicular to the axial direction;
   a first sealing surface on a first axial end of the annular body, the first sealing surface including:
      a first deformable annular protrusion extending from the annular body in the axial direction to a first apex, the first deformable annular protrusion configured to deform upon engagement with a first planar sealing surface, the first apex being positioned, from an inner diameter of the annular body defining the axial hole, 50%-70% of a distance from the inner diameter to an outer diameter of the annular body; and
      a first seal ring engagement surface configured to engage a first annular rounded sealing ring, the first seal ring engagement surface extending inward from the first apex at a first angle in a range of about 10 degrees to about 35 degrees relative to the radial plane;
   a second sealing surface on a second axial end of the annular body opposite the first axial end, the second sealing surface including:
      a second deformable annular protrusion extending from the annular body in the axial direction to a second apex, the second deformable annular protrusion configured to deform upon engagement with a second planar sealing surface, the second apex being positioned, from the inner diameter of the annular body defining the axial hole, 50%-70% of the distance from the inner diameter to the outer diameter of the annular body; and

a second seal ring engagement surface configured to engage a second annular rounded sealing ring, the second seal ring engagement surface extending inward from the second apex at a second angle in a range of about 10 degrees to about 35 degrees relative to the radial plane;
   wherein the first sealing surface includes an outer extension surface that extends radially outward from the first apex to the outer diameter of the annular body.

2. The ring seal of claim 1, wherein the second sealing surface is a mirror image of the first sealing surface reflected over the radial plane of the annular body perpendicular to the axial direction.

3. The ring seal of claim 1, wherein the first seal ring engagement surface has a radial length sized to receive the first annular rounded sealing ring thereagainst.

4. The ring seal of claim 1, wherein the first deformable annular protrusion is configured to deform to form a C-seal upon engagement with the first planar sealing surface.

5. The ring seal of claim 1, wherein the first seal ring engagement surface is configured to engage the first annular rounded sealing ring to form a W-seal.

6. The ring seal of claim 1, wherein the first seal ring engagement surface of the first sealing surface extends radially inward of the first apex of the first deformable annular protrusion a substantial portion of the distance from the first apex to the inner diameter.

7. The ring seal of claim 1, wherein the first seal ring engagement surface of the first sealing surface extends radially inward to a radial surface, the radial surface extending substantially parallel to the radial plane.

8. The ring seal of claim 1, wherein the first apex of the first deformable annular protrusion is positioned about 60% of the distance from the inner diameter to the outer diameter of the annular body.

9. The ring seal of claim 1, wherein the outer extension surface has a steeper slope to the first apex relative to the radial plane than the first seal ring engagement surface.

10. The ring seal of claim 1, wherein the first seal ring engagement surface is a frustoconical surface extending to the first apex.

11. The ring seal of claim 10, wherein the first seal engagement surface extends away from the second axial end as the first seal engagement surface extends radially outward.

12. The ring seal of claim 1, wherein the first seal engagement surface extends at an oblique angle that is less than 30 degrees relative to the radial plane.

13. A ring seal for sealing opposing flow component sealing surfaces defining a fluid flow path, the ring seal comprising:
   an annular seal body defining an axial hole for fluid passage in an axial direction; and
   a first sealing surface and second sealing surface on opposing axial ends of the annular seal body;
   the first sealing surface including a first annular extension extending from the annular seal body in a first axial direction to a first apex, the first apex being positioned, from an inner diameter of the annular body defining the axial hole, 50%-70% of a distance from the inner diameter to an outer diameter of the annular body, the first annular extension comprising a first extension surface and a second extension surface extending in opposite directions from the first apex back toward the annular sealing body, the first extension surface extending inward from the first apex at a first angle in a range of about 10 degrees to about 35 degrees relative to a radial plane perpendicular the axial direction, the second extension surface having a steeper slope to the first apex than the first extension surface such that the first extension surface is configured to deform into engagement with a planar surface to form a fluid tight seal, the first extension surface being configured to engage an annular rounded sealing ring to form a fluid tight seal.

14. The ring seal of claim 13, wherein the second sealing surface includes a second annular extension extending from the annular seal body in a second axial direction opposite the first axial direction to a second apex, the second apex being positioned, from the inner diameter of the annular body, 50%-70% of the distance from the inner diameter to the outer diameter of the annular body, wherein the second annular extension comprises a third extension surface and a fourth extension surface extending in opposite directions from the second apex back toward the annular sealing body, the third extension surface extending inward from the second apex at a second angle in a range of about 10 degrees to about 35 degrees relative to a radial plane perpendicular to the axial direction, the fourth extension surface of having a steeper slope to the second apex than the third extension surface, the second annular extension configured to deform upon engagement with a planar surface to form a fluid tight seal, the third extension surface being configured to engage an annular rounded sealing ring to form a fluid tight seal.

15. The ring seal of claim 13, wherein the second sealing surface is a mirror image of the first sealing surface, reflected over the radial plane.

16. The ring seal of claim 13, wherein the first sealing surface includes a radial surface extending from the axial hole to the first extension surface.

17. The ring seal of claim 16, wherein the radial surface includes a planar portion extending substantially perpendicular to the axial direction.

18. The ring seal of claim 13, wherein a length of the first extension surface in the radial direction is sized to receive the annular rounded sealing ring.

19. The ring seal of claim 13, wherein the first apex is positioned about 60% of the distance from the inner diameter to the outer diameter.

20. The ring seal of claim 19, wherein the second extension surface extends from the first apex to the outer surface.

21. The ring seal of claim 13, wherein the first extension surface has a slope of about 30 degrees relative to the radial plane.

22. A metal seal comprising:
an annular body defining a fluid passageway therethrough in an axial direction;
a first sealing surface on an axial end of the annular body, the first sealing surface comprising an annular extension protruding from the annular body in an axial direction, the annular extension including a first extension surface and a second extension surface extending from the annular body at least in part in the axial direction to an apex, the apex being positioned, from an inner diameter of the annular body defining the fluid passageway, 50%-70% of a distance from the inner diameter to an outer diameter of the annular body, the first extension surface extending inward from the apex at a first angle in a range of about 55 degrees to about 80 degrees relative to the axial direction, the second extension surface having a steeper slope to the apex than the first extension surface such that the first sealing surface is capable of forming a fluid tight seal between the annular body and a generally flat surface when the sealing surface is forced against the generally flat surface, the annular extension being deformable to cause the first extension surface to engage the generally flat surface;
wherein the sealing surface is further capable of forming a fluid tight seal between the annular body and an annular sealing ring when the first sealing surface is forced against the annular sealing ring, the annular sealing ring engaging an annular portion of the sealing surface radially inward of the apex of the annular extension.

23. A ring seal comprising:
an annular body defining an axial hole therethrough for fluid passage in an axial direction, the annular body having a radial plane perpendicular to the axial direction;
a first sealing surface on a first axial end of the annular body, the first sealing surface including:
a first deformable annular protrusion extending from the annular body in the axial direction to a first apex, the first deformable annular protrusion configured to deform upon engagement with a first planar sealing surface, the first apex being positioned, from an inner diameter of the annular body defining the axial hole, 50%-70% of a distance from the inner diameter to an outer diameter of the annular body; and
a first seal ring engagement surface configured to engage a first annular rounded sealing ring, the first seal ring engagement surface extending inward from the first apex at a first angle in a range of about 10 degrees to about 35 degrees relative to the radial plane;
a second sealing surface on a second axial end of the annular body opposite the first axial end, the second sealing surface including:
a second deformable annular protrusion extending from the annular body in the axial direction to a second apex, the second deformable annular protrusion configured to deform upon engagement with a second planar sealing surface, the second apex being positioned, from the inner diameter of the annular body defining the axial hole, 50%-70% of the distance from the inner diameter to the outer diameter of the annular body; and
a second seal ring engagement surface configured to engage a second annular rounded sealing ring, the second seal ring engagement surface extending inward from the second apex at a second angle in a range of about 10 degrees to about 35 degrees relative to the radial plane;
wherein the first deformable annular protrusion is formed of the first seal ring engagement surface and a protrusion surface extending in opposite directions from the first apex back toward the annular body, the protrusion surface having a steeper slope to the first apex relative to the radial plane than the first seal ring engagement surface such that the first ring seal engagement surface is configured to deform into engagement with a planar surface to form a fluid tight seal.

* * * * *